(12) United States Patent
Noonan et al.

(10) Patent No.: US 9,681,605 B2
(45) Date of Patent: Jun. 20, 2017

(54) HARVESTER FEED RATE CONTROL

(71) Applicant: Deere & Company, Moline, IL (US)

(72) Inventors: James T. Noonan, Bondurant, IA (US);
Kevin J. Goering, Cambridge, IA (US);
Steven D. Wallestad, Ankeny, IA (US);
Mark A. Cracraft, Johnston, IA (US);
Jerry B. Hall, Johnston, IA (US); Nile T. Ackerman, Swan, IA (US)

(73) Assignee: DEERE & COMPANY, Moline, IL (US)

( * ) Notice: Subject to any disclaimer, the term of this patent is extended or adjusted under 35 U.S.C. 154(b) by 53 days.

(21) Appl. No.: 14/922,342

(22) Filed: Oct. 26, 2015

(65) Prior Publication Data

US 2017/0112060 A1    Apr. 27, 2017

(51) Int. Cl.
| | | |
|---|---|---|
| A01D 41/00 | (2006.01) | |
| A01D 41/127 | (2006.01) | |
| A01D 61/02 | (2006.01) | |
| A01D 69/02 | (2006.01) | |
| A01D 69/03 | (2006.01) | |
| A01D 46/08 | (2006.01) | |
| A01D 101/00 | (2006.01) | |

(52) U.S. Cl.
CPC ......... *A01D 41/1271* (2013.01); *A01D 46/08* (2013.01); *A01D 61/02* (2013.01); *A01D 69/02* (2013.01); *A01D 69/03* (2013.01); *A01D 2101/00* (2013.01)

(58) Field of Classification Search
CPC .............. A01D 41/127; A01D 41/1271; A01D 41/1273; A01D 46/08; A01D 46/082; A01D 46/085; A01D 75/28; A01D 61/02; A01D 69/02; A01D 69/03; A01D 2101/00; A01F 12/56; A01F 2015/0808; Y10S 56/15
USPC ..... 56/10.2 C, 10.2 R, 16.4 B, 28, 341, 432; 100/88, 89; 414/303, 412, 607; 460/1, 4, 460/6, 150; 701/50
See application file for complete search history.

(56) References Cited

U.S. PATENT DOCUMENTS

| | | | |
|---|---|---|---|
| 5,873,227 A | 2/1999 | Arner | |
| 6,263,650 B1 * | 7/2001 | Deutsch | ............... A01D 46/082 56/16.4 B |
| 6,901,732 B2 * | 6/2005 | Bares | ..................... A01D 46/08 100/88 |
| 7,591,628 B2 * | 9/2009 | Noonan | ............... A01D 87/127 100/89 |

(Continued)

*Primary Examiner* — Robert Pezzuto

(57) ABSTRACT

A harvester having a harvesting structure, an accumulator, and a module builder having a throat. A plurality of meter rollers are positioned to receive crop and transfer crop at a feed rate in cooperation with a beater roller. A feeder belt receives crop from the meter rollers and the beater roller and transfers the crop to the throat. A feed rate control system comprises at least one crop mass flow feedback device providing a crop mass flow feedback signal indicative of crop mass flow. A controller is provided that is in communication with the at least one crop mass flow feedback device and configured to operate in a first mode by lowering the feed rate when the crop mass flow feedback signal indicates a threshold has been reached and by raising the feed rate when the crop mass flow feedback signal indicates the threshold has not been reached.

20 Claims, 4 Drawing Sheets

(56) References Cited

U.S. PATENT DOCUMENTS

| | | | |
|---|---|---|---|
| 7,648,413 B2* | 1/2010 | Duquesne | A01D 41/127 460/112 |
| 8,781,694 B1* | 7/2014 | Sheidler | A01D 41/1274 56/11.1 |
| 2003/0060245 A1 | 3/2003 | Coers et al. | |

* cited by examiner

190

Provide a harvester having a harvesting structure for harvesting crop, an accumulator for receiving harvested crop from the harvesting structure, and a module builder having a throat.

195

Receive harvested crop from the accumulator with the plurality of meter rollers that are configured to transfer the harvested crop at the feed rate.

200

Provide at least one beater roller configured to cooperate with the plurality of meter rollers to transfer the harvested crop at the feed rate.

205

Receive harvested crop from the plurality of meter rollers and the at least one beater roller with a feeder belt configured to transfer the harvested crop to the throat at the feed rate.

210

Control the feed rate with a feed rate control system that includes the crop mass flow feedback device that provides the crop mass flow feedback signal indicative of crop mass flow. The feed rate control system also includes the controller that is in communication with the crop mass flow feedback device and configured to lower the feed rate when the crop mass flow feedback signal indicates a threshold has been reached and raise the feed rate when the crop mass flow feedback signal indicates the threshold has not been reached.

FIG. 4

HARVESTER FEED RATE CONTROL

FIELD OF THE DISCLOSURE

The present disclosure generally relates to harvesters, and more particularly to a system and method for controlling harvester feed rate.

BACKGROUND OF THE DISCLOSURE

In order to harvest crops, the engine and feed rates of harvesters are commonly set at constant speeds regardless of crop mass flow.

SUMMARY OF THE DISCLOSURE

In one embodiment, a harvester having a harvesting structure for harvesting crop, an accumulator for receiving harvested crop from the harvesting structure, and a module builder having a throat is disclosed. The harvester comprises a plurality of meter rollers positioned to receive harvested crop from the accumulator. The plurality of meter rollers are configured to transfer harvested crop at a feed rate. At least one beater roller is configured to cooperate with the plurality of meter rollers to transfer harvested crop at the feed rate. A feeder belt is configured to receive harvested crop from the plurality of meter rollers and the at least one beater roller and transfer the harvested crop to the throat at the feed rate. A feed rate control system for controlling the feed rate is provided. The feed rate control system comprises at least one crop mass flow feedback device providing a crop mass flow feedback signal indicative of crop mass flow. A controller is provided that is in communication with the at least one crop mass flow feedback device and configured to operate in a first mode by lowering the feed rate when the crop mass flow feedback signal indicates a threshold has been reached and by raising the feed rate when the crop mass flow feedback signal indicates the threshold has not been reached.

In another embodiment, a method for harvesting crop with a harvester having a harvesting structure for harvesting crop, an accumulator for receiving harvested crop from the harvesting structure, and a module builder having a throat is disclosed. The method comprises receiving harvested crop from the accumulator with a plurality of meter rollers configured to transfer harvested crop at a feed rate. Providing at least one beater roller configured to cooperate with the plurality of meter rollers to transfer harvested crop at the feed rate. Receiving harvested crop from the plurality of meter rollers and the at least one beater roller with a feeder belt configured to transfer the harvested crop to the throat at the feed rate. Controlling the feed rate with a feed rate control system. The feed rate control system comprises at least one crop mass flow feedback device providing a crop mass flow feedback signal indicative of crop mass flow. A controller is in communication with the at least one crop mass flow feedback device and configured to lower the feed rate when the crop mass flow feedback signal indicates a threshold was reached and raise the feed rate when the crop mass flow feedback signal indicates the threshold was not reached.

In yet another embodiment, a harvester having a harvesting structure for harvesting crop, an accumulator for receiving harvested crop from the harvesting structure, and a module builder having a throat is disclosed. The harvester comprises a plurality of meter rollers positioned to receive harvested crop from the accumulator. The plurality of meter rollers are configured to transfer harvested crop at a feed rate. A first motor is positioned to rotate the plurality of meter rollers. At least one beater roller is configured to cooperate with the plurality of meter rollers to transfer harvested crop at the feed rate. A second motor is positioned to rotate the beater roller. A feeder belt is configured to receive harvested crop from the plurality of meter rollers and the at least one beater roller and transfer the harvested crop to the throat at the feed rate. A third motor is positioned to rotate the feeder belt. A feed rate control system in communication with the first motor, the second motor, and the third motor for controlling the feed rate is provided. The feed rate control system comprises at least one crop mass flow feedback device providing a crop mass flow feedback signal indicative of crop mass flow. A controller is provided that is in communication with the at least one crop mass flow feedback device and configured to operate in a first mode by lowering the feed rate when the crop mass flow feedback signal indicates a threshold has been reached and by raising the feed rate when the crop mass flow feedback signal indicates the threshold has not been reached.

Other features and aspects will become apparent by consideration of the detailed description and accompanying drawings.

BRIEF DESCRIPTION OF THE DRAWINGS

FIG. 4 is a schematic of an illustrative method for harvesting crop.

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Further embodiments of the invention may include any combination of features from one or more dependent claims, and such features may be incorporated, collectively or separately, into any independent claim.

DETAILED DESCRIPTION

Figure 1:
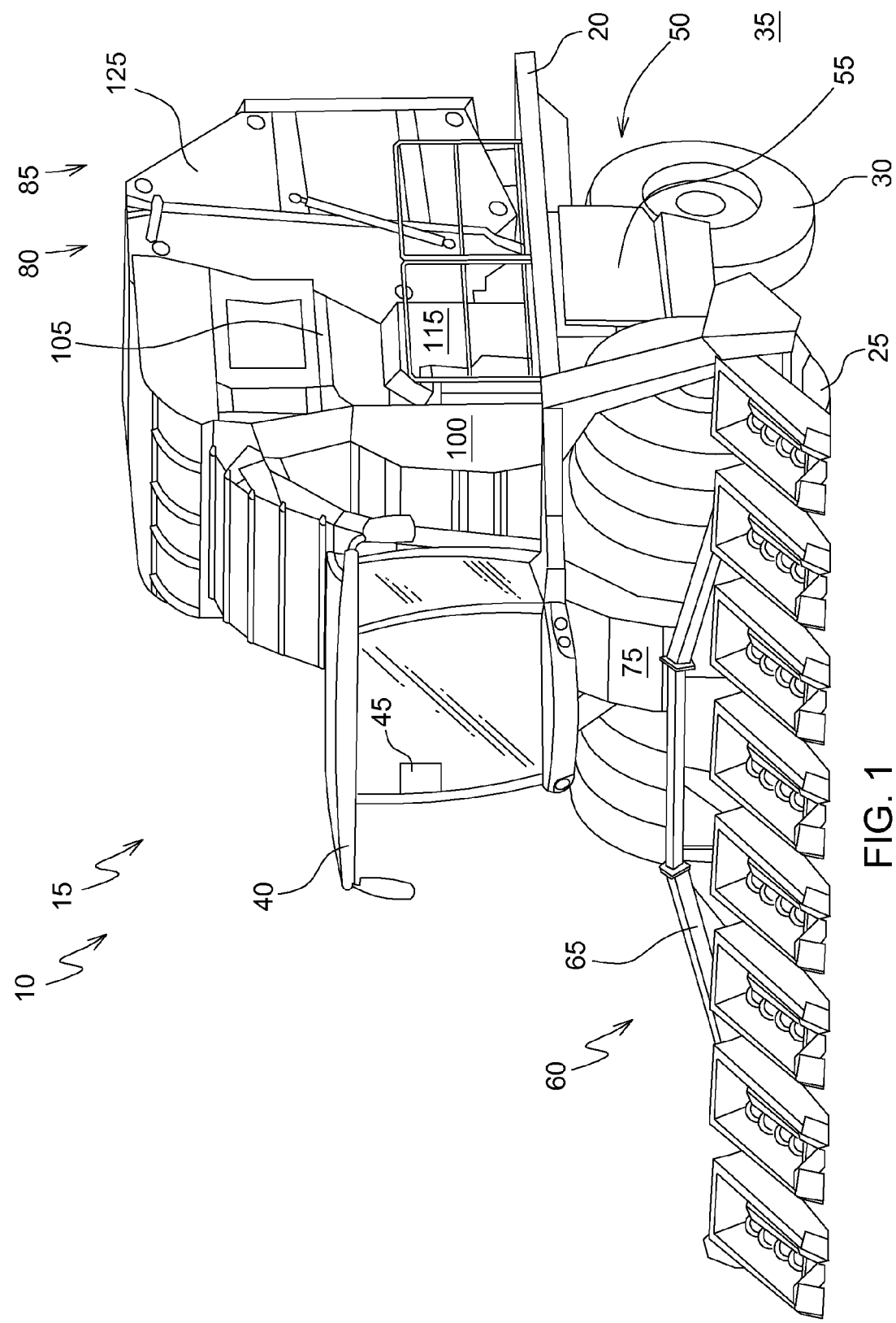
FIG. 1 is a perspective view of a harvester according to one embodiment.
Figure 2:
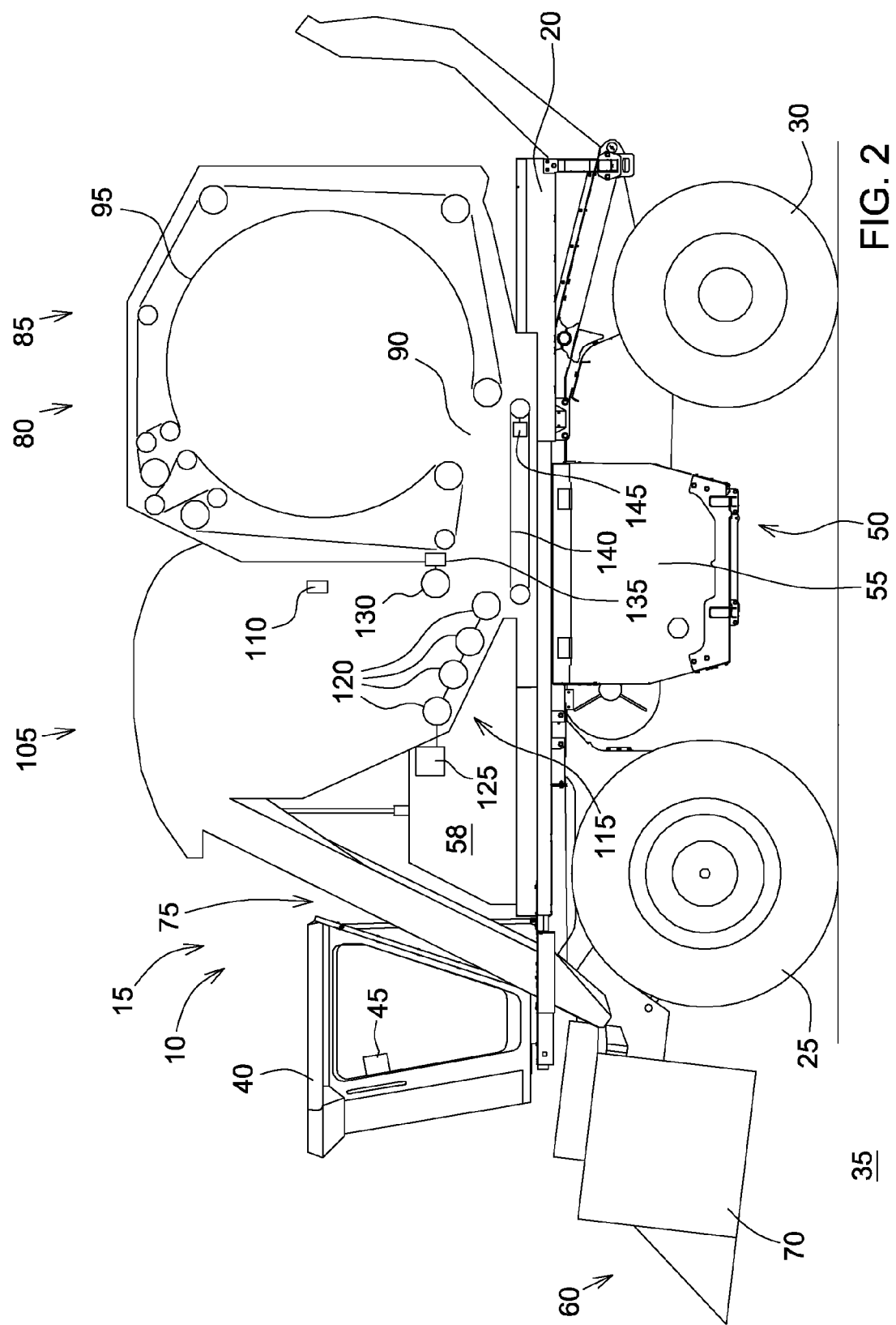
FIG. 2 is a side view of a harvester according to another embodiment.

FIGS. 1 and 2 illustrate a harvester 10. The illustrated harvester 10 is a cotton harvester 15 (e.g., cotton picker, cotton stripper). Other types of harvesters 10 are contemplated by this disclosure (e.g., combine).

The harvester 10 includes a chassis 20. The illustrated chassis 20 is supported by front wheels 25 and rear wheels 30 although other support is contemplated (e.g., tracks). The harvester 10 is adapted for movement through a field 35 to harvest crops (e.g., cotton, corn, stover, hay, and alfalfa). An operator station 40 is supported by the chassis 20. An operator interface 45 is positioned in the operator station 40. A power module 50 may be supported below the chassis 20. The power module 50 may be an engine 55. Water, lubricant, and fuel tanks, indicated generally at 58 (FIG. 2), may be supported on the chassis 20.

A harvesting structure 60 is coupleable to the chassis 20. The illustrated harvesting structure 60 is configured to remove cotton from the field 35. The harvesting structure 60 may be a cotton stripper header 65 (FIG. 1), one or more cotton picking units 70 (FIG. 2), or another harvesting structure (e.g., corn head). Alternatively, the harvesting structure 60 may be configured to remove corn, or other crop.

An air duct system 75 is coupleable to the harvesting structure 60. A crop receptacle 80 is coupleable to the air duct system 75. With reference to FIG. 2, the illustrated crop receptacle 80 is a module builder 85 having a throat 90 and at least one baler belt 95. Referring to FIG. 1, a cleaner 100 is provided that cleans the cotton harvested from the cotton stripper header 65 by removing trash and debris. An accumulator 105 is provided that is configured to receive cotton, or other crop, harvested by the cotton stripper header 65 or the cotton picking units 70 (FIG. 2). With reference to FIG. 2, an accumulator feedback device 110 may be coupled to the accumulator 105 to provide an accumulator fill level signal indicative of the accumulator 105 fill level.

With continued reference to FIG. 2, a feeder 115 is coupleable to the chassis 20. The feeder 115 is configured to receive cotton, or other crop, from the accumulator 105. The feeder 115 includes a plurality of meter rollers 120 configured to compress the cotton, or other crop, and transfer the cotton, or other crop, to the module builder 85 at a feed rate. A first motor 125 is positioned to rotate the plurality of meter rollers 120. The first motor 125 may be hydraulic or electric.

At least one beater roller 130 is configured to cooperate with the plurality of meter rollers 120 to transfer the crop at the feed rate. A second motor 135 is positioned to rotate the beater roller 130. The second motor 135 may be hydraulic or electric.

A feeder belt 140 is configured to receive crop from the plurality of meter rollers 120 and the at least one beater roller 130 and transfer the crop to the throat 90 at the feed rate. A third motor 145 is positioned to rotate the feeder belt 140. The third motor 145 may be hydraulic or electric.

Figure 3:
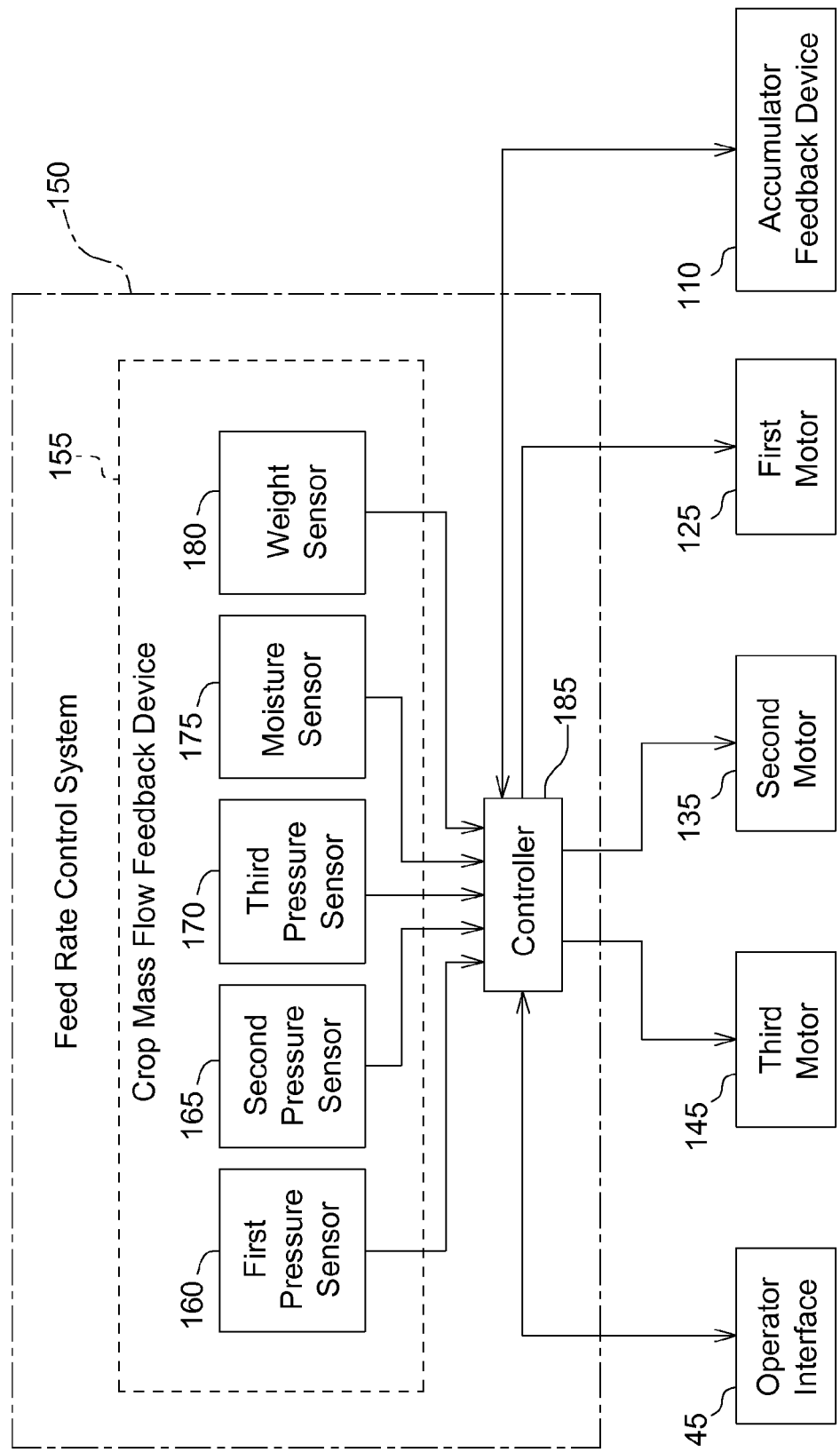
FIG. 3 is a schematic of a control system of a harvester according to yet another embodiment.

With reference to FIG. 3, the harvester 10 has a feed rate control system 150 in communication with the first motor 125, the second motor 135, and the third motor 145 for controlling the feed rate. The feed rate control system 150 includes at least one crop mass flow feedback device 155. The crop mass flow feedback device 155 provides a crop mass flow feedback signal indicative of crop mass flow.

The crop mass flow feedback device 155 may be a first pressure sensor 160 positioned to sense the pressure of the first motor 125, a second pressure sensor 165 positioned to sense the pressure of the second motor 135, and a third pressure sensor 170 positioned to sense the pressure of the third motor 145 and the threshold is a pressure limit for at least one of the first motor 125, the second motor 135, and the third motor 145.

Alternatively, the crop mass flow feedback device 155 may be a moisture sensor 175 providing a crop moisture signal. The moisture sensor 175 is coupleable to the accumulator 105, the module builder 85, and the feeder 115. The crop mass flow feedback device may also be a weight sensor 180 providing a weight signal. The weight sensor 180 is coupleable to the accumulator 105, the module builder 85, and the feeder 115 and provides an indication of the weight of the crop which indicates moisture level.

A controller 185 is in communication with the crop mass flow feedback device 155 and is configured to operate in a first mode by lowering the feed rate when the crop mass flow feedback signal indicates a threshold has been reached and by raising the feed rate when the crop mass flow feedback signal indicates the threshold has not been reached. The threshold may be at least one of a crop mass flow value, a crop moisture value, or a crop weight value. The threshold may be set using the operator interface 45.

Alternatively, the controller 185 may be in communication with the accumulator feedback device 110 and configured to operate in a second mode by operating the feeder belt 140 and the baler belt 95 when at least one of the accumulator fill level signal indicates the accumulator is empty and the baler belt 95 has not been operated for at least one hour. Alternatively, more than one hour could also be used. The controller 185 may be configured to operate in the first mode when the accumulator fill level signal indicates the accumulator 105 is full.

Alternatively, the harvester 10 could be started at a first feed rate that is slower than a second feed rate for at least one of a set period of time, until the crop moisture signal stays below the threshold, and until the weight signal stays below the threshold.

A method for harvesting crop is illustrated in FIG. 4. In step 190, the harvester 10 having the harvesting structure 60, the accumulator 105, and the module builder 85 having the throat 90 is provided. In step 195, harvested crop is received from the accumulator via the plurality of meter rollers that are configured to transfer the harvested crop at the feed rate. In step 200, at least one beater roller is provided and configured to cooperate with the plurality of meter rollers to transfer the harvested crop at the feed rate. In step 205, the feeder belt receives the harvested crop from the plurality of meter rollers and the at least one beater roller and transfers the crop to the throat at the feed rate.

In step 210, the feed rate control system 150 is provided that includes the crop mass flow feedback device 155 that provides the crop mass flow feedback signal indicative of crop mass flow. The feed rate control system 150 also includes the controller 185 that is in communication with the crop mass flow feedback device 155 and configured to lower the feed rate when the crop mass flow feedback signal indicates a threshold has been reached and raise the feed rate when the crop mass flow feedback signal indicates the threshold has not been reached.

Various features are set forth in the following claims.

What is claimed is:

1. A harvester having a harvesting structure for harvesting crop, an accumulator for receiving harvested crop from the harvesting structure, and a module builder having a throat, the harvester comprising:
   a plurality of meter rollers positioned to receive harvested crop from the accumulator, the plurality of meter rollers configured to transfer harvested crop at a feed rate;
   at least one beater roller configured to cooperate with the plurality of meter rollers to transfer harvested crop at the feed rate;
   a feeder belt configured to receive harvested crop from the plurality of meter rollers and the at least one beater roller and transfer the harvested crop to the throat at the feed rate; and
   a feed rate control system for controlling the feed rate, the feed rate control system comprising:
      at least one crop mass flow feedback device providing a crop mass flow feedback signal indicative of crop mass flow; and
      a controller in communication with the at least one crop mass flow feedback device and configured to operate in a first mode by lowering the feed rate when the crop mass flow feedback signal indicates a threshold has been reached and by raising the feed rate when the crop mass flow feedback signal indicates the threshold has not been reached.

2. The harvester of claim 1, further comprising a first hydraulic motor positioned to rotate the plurality of meter rollers, a second hydraulic motor positioned to rotate the at least one beater roller, and a third hydraulic motor positioned to rotate the feeder belt.

3. The harvester of claim 2, wherein the at least one crop mass flow feedback device is a first pressure sensor positioned to sense the pressure of the first hydraulic motor, a second pressure sensor positioned to sense the pressure of the second hydraulic motor, and a third pressure sensor positioned to sense the pressure of the third hydraulic motor and the threshold is a pressure limit for at least one of the first hydraulic motor, the second hydraulic motor, and the third hydraulic motor.

4. The harvester of claim 1, further comprising an operator interface where an operator can set the threshold.

5. The harvester of claim 1, further comprising a first electric motor positioned to rotate the plurality of meter rollers, a second electric motor positioned to rotate the at least one beater roller, and a third electric motor positioned to rotate the feeder belt.

6. The harvester of claim 1, wherein the at least one crop mass flow feedback device is at least one of a moisture sensor providing a crop moisture signal and a weight sensor providing a weight signal.

7. The harvester of claim 1, wherein the harvester is a cotton harvester and the harvesting structure is at least one of a cotton picking unit and a cotton stripper header and the crop receptacle is a module builder.

8. The harvester of claim 1, wherein the module builder comprises at least one baler belt, an accumulator feedback device is coupled to the accumulator to provide an accumulator fill level signal indicative of the accumulator fill level, and the controller is in communication with the accumulator feedback device and configured to operate in a second mode by operating the feeder belt and the baler belt when at least one of the accumulator fill level signal indicates the accumulator is empty and the baler belt has not been operated for at least one hour.

9. The harvester of claim 8, wherein the controller is configured to operate in the first mode when the accumulator fill level signal indicates the accumulator is full.

10. A method for harvesting crop with a harvester having a harvesting structure for harvesting crop, an accumulator for receiving harvested crop from the harvesting structure, and a module builder having a throat, the method comprising:
    receiving harvested crop from the accumulator with a plurality of meter rollers configured to transfer harvested crop at a feed rate;
    providing at least one beater roller configured to cooperate with the plurality of meter rollers to transfer harvested crop at the feed rate;
    receiving harvested crop from the plurality of meter rollers and the at least one beater roller with a feeder belt configured to transfer the harvested crop to the throat at the feed rate; and
    controlling the feed rate with a feed rate control system comprising:
        at least one crop mass flow feedback device providing a crop mass flow feedback signal indicative of crop mass flow; and
        a controller in communication with the at least one crop mass flow feedback device and configured to lower the feed rate when the crop mass flow feedback signal indicates a threshold was reached and raise the feed rate when the crop mass flow feedback signal indicates the threshold was not reached.

11. The method of claim 10, wherein the at least one crop mass flow feedback device is at least one of a moisture sensor providing a crop moisture signal and a weight sensor providing a weight signal.

12. The method of claim 11, further comprising starting the harvester at a first feed rate that is slower than a second feed rate for at least one of a set period of time, until the crop moisture signal stays below the threshold, and until the weight signal stays below the threshold.

13. The method of claim 10, further comprising an operator interface where an operator can set the threshold.

14. The method of claim 10, wherein the module builder comprises at least one baler belt, an accumulator feedback device is coupled to the accumulator to provide an accumulator fill level signal indicative of the accumulator fill level, and the controller is in communication with the accumulator feedback device and configured to operate in a second mode by operating the feeder belt and the baler belt when at least one of the accumulator fill level signal indicates the accumulator is empty and the baler belt has not been operated for at least one hour.

15. The method of claim 14, wherein the controller is configured to operate in the first mode when the accumulator fill level signal indicates the accumulator is full.

16. The method of claim 10, further comprising a first motor positioned to rotate the plurality of meter rollers, a second motor positioned to rotate the beater roller, and a third motor positioned to rotate the feeder belt where the feed rate control system is in communication with the first motor, the second motor, and the third motor for controlling the feed rate.

17. The method of claim 16, wherein the first motor, the second motor, and the third motor are at least one of hydraulic and electric.

18. The method of claim 10, wherein the harvester is a cotton harvester and the harvesting structure is at least one of a cotton picking unit and a cotton stripper header and the crop receptacle is a module builder.

19. A harvester having a harvesting structure for harvesting crop, an accumulator for receiving harvested crop from the harvesting structure, and a module builder having a throat, the harvester comprising:
    a plurality of meter rollers positioned to receive harvested crop from the accumulator, the plurality of meter rollers configured to transfer harvested crop at a feed rate;
    a first motor positioned to rotate the plurality of meter rollers;
    at least one beater roller configured to cooperate with the plurality of meter rollers to transfer harvested crop at the feed rate;
    a second motor positioned to rotate the beater roller;
    a feeder belt configured to receive harvested crop from the plurality of meter rollers and the at least one beater roller and transfer the harvested crop to the throat at the feed rate;
    a third motor positioned to rotate the feeder belt; and
    a feed rate control system in communication with the first motor, the second motor, and the third motor for controlling the feed rate, the feed rate control system comprising:
        at least one crop mass flow feedback device providing a crop mass flow feedback signal indicative of crop mass flow; and
        a controller in communication with the at least one crop mass flow feedback device and configured to operate in a first mode by lowering the feed rate when the crop mass flow feedback signal indicates a threshold has been reached and by raising the feed rate when the crop mass flow feedback signal indicates the threshold has not been reached.

20. The harvester of claim 19, wherein the first motor, the second motor, and the third motor are at least one of hydraulic and electric.

\* \* \* \* \*